(12) United States Patent
Sadakane

(10) Patent No.: US 12,206,072 B2
(45) Date of Patent: Jan. 21, 2025

(54) LITHIUM SECONDARY BATTERY

(71) Applicant: Panasonic Intellectual Property Management Co., Ltd., Osaka (JP)

(72) Inventor: Takuya Sadakane, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 665 days.

(21) Appl. No.: 17/274,856

(22) PCT Filed: Jul. 25, 2019

(86) PCT No.: PCT/JP2019/029129
§ 371 (c)(1),
(2) Date: Mar. 10, 2021

(87) PCT Pub. No.: WO2020/066253
PCT Pub. Date: Apr. 2, 2020

(65) Prior Publication Data
US 2022/0052381 A1  Feb. 17, 2022

(30) Foreign Application Priority Data

Sep. 28, 2018 (JP) ................... 2018-185177

(51) Int. Cl.
*H01M 10/0568* (2010.01)
*H01M 4/02* (2006.01)
(Continued)

(52) U.S. Cl.
CPC ....... *H01M 10/0568* (2013.01); *H01M 4/134* (2013.01); *H01M 4/382* (2013.01);
(Continued)

(58) Field of Classification Search
CPC ......... H01M 10/0568; H01M 10/0525; H01M 4/134; H01M 4/382; H01M 4/662; H01M 2004/027; H01M 2300/0025
See application file for complete search history.

(56) References Cited

U.S. PATENT DOCUMENTS

| 4,857,423 A | 8/1989 | Abraham et al. |
| 5,731,106 A | 3/1998 | Tsutsumi et al. |

(Continued)

FOREIGN PATENT DOCUMENTS

| CN | 104300173 A | 1/2015 |
| EP | 0319182 A2 | 6/1989 |

(Continued)

OTHER PUBLICATIONS

International Search Report dated Oct. 29, 2019, issued in counterpart application No. PCT/JP2019/029129 (2 pages).
(Continued)

*Primary Examiner* — Aiqun Li
(74) *Attorney, Agent, or Firm* — WHDA, LLP

(57) ABSTRACT

A lithium secondary battery including a positive electrode, a negative electrode having a negative electrode current collector that faces the positive electrode, and a non-aqueous electrolyte, wherein lithium metal deposits on the negative electrode during charge, and the lithium metal dissolves from the negative electrode into the non-aqueous electrolyte during discharge. The non-aqueous electrolyte includes an organic compound having a redox potential of 0 V or more and 4 V or less vs $Li/Li^+$.

10 Claims, 3 Drawing Sheets

(51) Int. Cl.
  *H01M 4/134* (2010.01)
  *H01M 4/38* (2006.01)
  *H01M 4/66* (2006.01)
  *H01M 10/0525* (2010.01)

(52) U.S. Cl.
  CPC ....... *H01M 4/662* (2013.01); *H01M 10/0525* (2013.01); *H01M 2004/027* (2013.01); *H01M 2300/0025* (2013.01)

(56) References Cited

U.S. PATENT DOCUMENTS

| | | | |
|---|---|---|---|
| 6,387,571 B1 * | 5/2002 | Lain | H01M 10/052 429/303 |
| 2009/0181308 A1 | 7/2009 | Chiga et al. | |
| 2012/0141889 A1 | 6/2012 | Lee et al. | |
| 2012/0212186 A1 | 8/2012 | Fujii et al. | |
| 2013/0065115 A1 | 3/2013 | Kaye et al. | |
| 2014/0370405 A1 * | 12/2014 | Zhang | H01M 8/20 429/418 |
| 2018/0301739 A1 | 10/2018 | Park et al. | |
| 2018/0316068 A1 | 11/2018 | Park et al. | |
| 2018/0331393 A1 * | 11/2018 | Cho | H01M 10/0568 |

FOREIGN PATENT DOCUMENTS

| | | |
|---|---|---|
| JP | 1-206571 A | 8/1989 |
| JP | 4-242074 A | 8/1992 |
| JP | H9-204932 A | 8/1997 |
| JP | 9-259929 A | 10/1997 |
| JP | 2001-243957 A | 9/2001 |
| JP | 2009-164082 A | 7/2009 |
| JP | 2010-061851 A | 3/2010 |
| JP | 2012-124164 A | 6/2012 |
| JP | 2018-055934 A | 4/2018 |
| WO | 2017/150801 A1 | 9/2017 |
| WO | 2017/183810 A1 | 10/2017 |

OTHER PUBLICATIONS

Extended (Supplementary) European Search Report dated Oct. 14, 2021, issued in counterpart EP application No. 19867216.4. (9 pages).

Kang, Yoon-Sok et al., "Tetrathiafulvalene as a Conductive Film-Making Additive on High-Voltage Cathode", Applied Materials & Interfaces, Jan. 2017, vol. 9, No. 4, pp. 3590-3595, XP055848014, cited in EP Extended European Search Report dated Oct. 14, 2021. (6 pages).

Li, Fujun et al., "Mechanistic Evolution of Aprotic Lithium-Oxygen Batteries", Advanced Energy Materials, Mar. 2017, vol. 7, No. 24, p. 1602934, XP055847992, cited in EP Extended European Search Report dated Oct. 14, 2021. (12 pages).

* cited by examiner

LITHIUM SECONDARY BATTERY

TECHNICAL FIELD

The present disclosure relates to a lithium secondary battery using lithium metal as a negative electrode active material.

BACKGROUND ART

A lithium ion battery is known as a high-capacity non-aqueous electrolyte secondary battery. The capacity of the lithium ion battery can be improved by, for example, using graphite and an alloy-type active material, such as a silicon compound, in combination as a negative electrode active material. However, the improvement in capacity of the lithium ion battery is approaching to the limit.

As a non-aqueous electrolyte secondary battery superior in capacity to the lithium ion battery, a lithium secondary battery (lithium metal secondary battery) is seen as promising. In the lithium secondary battery, lithium metal deposits on the negative electrode during charge, and the lithium metal dissolves during discharge and are released as lithium ions into the non-aqueous electrolyte. The lithium metal tends to deposit in a dendritic form during charge, causing the negative electrode to expand more during charge.

Patent Literature 1 related to a lithium secondary battery discloses using a battery container formed of a thin film including metal and resin to house a positive electrode, a negative electrode, and a non-aqueous electrolyte therein. The battery container with flexibility can expand and contract following the expansion and contraction of the negative electrode during charge and discharge. This can reduce the changes of the compression force applied to the positive and negative electrodes, and thus can suppress the drop-off of the active material from the positive and negative electrodes.

Patent Literature 2 related to a lithium secondary battery discloses a negative electrode (negative electrode current collector) whose surface on which lithium metal deposits has a ten-point average roughness (Rz) of 10 μm or less. This can suppress a local deposition of lithium metal and a growth of dendrites associated therewith.

CITATION LIST

Patent Literature

[PTL 1] Japanese Laid-Open Patent Publication No. H9-259929
[PTL 2] Japanese Laid-Open Patent Publication No. 2001-243957

SUMMARY OF INVENTION

It is still difficult, however, to control the morphology of the deposited lithium metal. Even according to the disclosures in Patent Literatures 1 and 2, the formation and growth of dendrites cannot be suppressed sufficiently. The lithium metal deposited in a dendritic form during charge starts to dissolve from the negative electrode current collector side during discharge, and therefore, part of the deposited lithium metal tends to be isolated from the negative electrode during discharge. Due to the isolation of lithium metal from the negative electrode, the capacity retention ratio tends to drop.

One aspect of the present disclosure relates to a lithium secondary battery, including: a positive electrode; a negative electrode having a negative electrode current collector that faces the positive electrode; and a non-aqueous electrolyte, wherein lithium metal deposits on the negative electrode during charge, and the lithium metal dissolves from the negative electrode into the non-aqueous electrolyte during discharge, the non-aqueous electrolyte including an organic compound having a redox potential of 0 V or more and 4 V or less vs $Li/Li^+$.

According to the present disclosure, in a lithium secondary battery, the drop of the capacity retention ratio due to the isolation of lithium metal from the negative electrode can be suppressed.

DESCRIPTION OF EMBODIMENTS

A lithium secondary battery according to an embodiment of the present disclosure includes a positive electrode, a negative electrode having a negative electrode current collector that faces the positive electrode, and a non-aqueous electrolyte, in which lithium metal deposits on the negative electrode during charge, and the lithium metal dissolves from the negative electrode into the non-aqueous electrolyte during discharge. The non-aqueous electrolyte includes an organic compound having a redox potential of 0 V or more and 4 V or less vs $Li/Li^+$.

By including the organic compound having a redox ability as above in the non-aqueous electrolyte, the lithium metal isolated from the negative electrode during discharge can be made available again for the charge-discharge reaction, and the capacity can be recovered. This can suppress the drop of the capacity retention ratio due to the isolation of lithium metal from the negative electrode.

Figure 1:
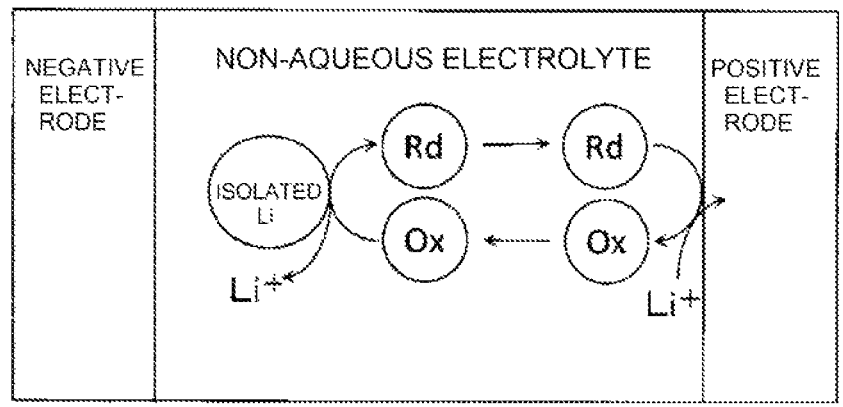
FIG. 1 A schematic diagram showing a capacity recovery mechanism in a lithium secondary battery according to an embodiment of the present disclosure.

The capacity recovery mechanism by the organic compound in the non-aqueous electrolyte will be described below with reference to FIG. 1. In FIG. 1, Ox represents an oxidized form of the organic compound, and Rd represents a reduced form of the organic compound.

Part of the lithium metal deposited in a dendritic form during charge becomes isolated from the negative electrode during discharge. The oxidized form (Ox) of the organic compound in the non-aqueous electrolyte approaches the lithium metal isolated from the negative electrode. The isolated lithium metal is oxidized by the oxidized form of the organic compound and converted into lithium ions, which dissolve in the non-aqueous electrolyte. At this time, the oxidized form of the organic compound turns into a reduced form. On the other hand, the reduced form of the organic compound approaches the positive electrode, causing a reduction reaction at the positive electrode. That is, a reaction in which the positive electrode active material absorbs lithium ions in the non-aqueous electrolyte is caused. At this time, the reduced form of the organic compound turns into the oxidized form. The organic compound turned into the oxidized form can be used again for the dissolution of the isolated lithium metal.

As described above, the above organic compound can serve to dissolve the isolated lithium metal in the non-aqueous electrolyte or to allow lithium ions to be absorbed into the positive electrode active material. In this way, the capacity reduced by the isolation of lithium metal can be recovered.

Organic compounds are mostly a compound that easily dissolves into the non-aqueous electrolyte, and its oxidized form (Ox) and reduced form (Rd) both tend to be stable at a potential of 0 V or more and 4 V or less vs $Li/Li^+$. Within the range of 0 V or more and 4 V or less vs $Li/Li^+$, the reactivity to the isolated lithium metal and the positive electrode can be easily controlled. Organic compounds are stable and hard to decompose, many of which rarely form a surface film and the like on the electrode surface and are unlikely to inhibit the charge-discharge reaction. Furthermore, by modifying the functional group, the redox potential can be easily adjusted.

When the organic compound has a redox potential of 0 V or more and 4 V or less vs $Li/Li^+$, the capacity recovery effect by the above mechanism can be obtained. When the redox potential of the organic compound is less than 0 V vs $Li/Li^+$, it is difficult to dissolve the isolated lithium metal into the non-aqueous electrolyte. When the redox potential of the organic compound exceeds 4 V vs $Li/Li^+$, due to the relation with the positive electrode potential, it is difficult in some cases to allow lithium ions to be absorbed into the positive electrode active material.

The redox potential of the organic compound is, for example, preferably 2 V or more and 4 V or less, more preferably 2.5 V or more and 3.7 V or less. In this case, the dissolution reaction of the isolated lithium metal into the non-aqueous electrolyte by the organic compound can proceed efficiently. Examples of the organic compound having a redox potential of about 2.5 V to 3.7 V vs $Li/Li^+$ include tetrathiafulvalene and ferrocene.

The capacity recovery through the above mechanism can be achieved more efficiently by, for example, leaving a battery in a discharged state (e.g., a battery having been discharged until a cut-off voltage is reached) to stand for a given period of time. When charge and discharge are cyclically repeated, it is preferable to provide a rest period for capacity recovery in the discharged battery, every after a predetermined number of cycles (e.g., every after 10 cycles to 100 cycles). The rest time is, for example, 20 h to 300 h. During the rest period after discharge, the above mechanism works, as a result of which the isolated lithium metal not used in the discharge reaction becomes available for the charge reaction in the cycle subsequent to the rest period. The reduced form of the organic compound produced through the dissolution reaction of the isolated lithium metal turns into the oxidized form through the reaction with the positive electrode, and becomes available again for the dissolution of the lithium metal. Therefore, even with a small amount of the organic compound, the capacity recovery effect can be stably obtained every after a predetermined number of cycles.

In view of making the above mechanism work efficiently, the organic compound preferably includes at least one selected from the group consisting of a tetrathiafulvalene compound, a metallocene compound, a quinone compound, a heteroaromatic compound, and a naphthalene compound. Preferred among them is a π-electron conjugated compound, and more preferred are a tetrathiafulvalene compound, a metallocene compound, and the like.

The tetrathiafulvalene compound is a general term for tetrathiafulvalene and its derivatives.

The tetrathiafulvalene compound is exemplified by a compound having a structure represented by the following general formula (1).

[Chem. 1]

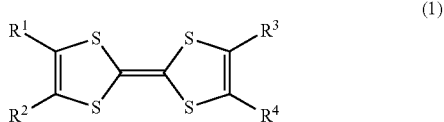

(1)

In the formula (1), $R^1$ to $R^4$ are each independently a hydrogen atom or a substituent other than hydrogen atom. Examples of the substituent include a halogen atom, a hydroxy group, an amino group, an alkyl group, an alkoxy group, and an alkylamino group. The alkyl group has, for example, 1 to 5 carbon atoms. The alkoxy group has, for example, 1 to 5 carbon atoms. The alkylamino group may be a monoalkylamino group, and may be a dialkylamino group. The alkylamino group has, for example, 1 to 5 carbon atoms. Some of the hydrogen atoms in the alkyl group may be each replaced with, for example, a halogen atom. Examples of the tetrathiafulvalene compound other than the compound having a structure represented by the formula (1) include bis(ethylenedithio)tetrathiafulvalene.

The metallocene compound is a general term for metallocene and its derivatives. The metallocene is a general term for organic metal compounds having two cyclopentadienyl anions as $\eta^5$-ligands.

The metallocene compound is exemplified by a compound having a structure represented by the following general formula (2).

[Chem. 2]

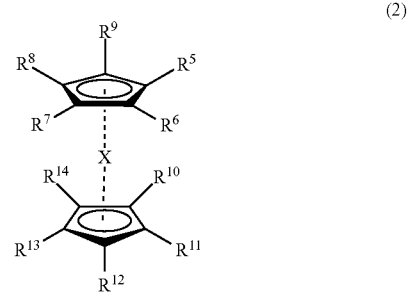

(2)

In the formula (2), X is an iron atom, a nickel atom, or a cobalt atom, and $R^5$ to $R^{14}$ are each independently a hydrogen atom or a substituent other than hydrogen atom. Examples of the substituent include a halogen atom, a hydroxy group, an amino group, an alkyl group, an alkoxy group, an alkylamino group, and a carboxy group. The alkyl group has, for example, 1 to 5 carbon atoms. The alkoxy group has, for example, 1 to 5 carbon atoms. The alkylamino group may be a monoalkylamino group, and may be a dialkylamino group. The alkylamino group has, for example, 1 to 5 carbon atoms. Some of the hydrogen atoms in the alkyl group may be each replaced with, for example, a halogen atom.

The metallocene compound specifically includes, for example, ferrocene, nickelocene, cobaltocene, 1,1'-dimethyl ferrocene, ferrocenecarboxylic acid, and derivatives thereof. Preferred among them is ferrocene.

The quinone compound is exemplified by a compound having a structure represented by the following general formula (3) and a compound having a structure represented by the following general formula (4).

[Chem. 3]

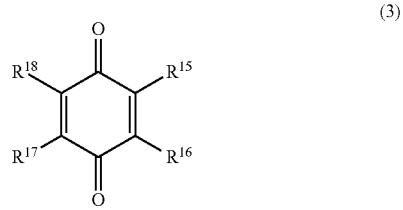

(3)

[Chem. 4]

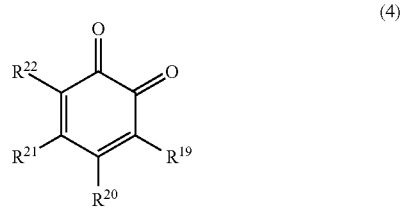

(4)

$R^{15}$ to $R^{18}$ in the formula (3) and $R^{19}$ to $R^{22}$ in the formula (4) are independently a hydrogen atom or a substituent other than hydrogen atom. Examples of the substituent include a halogen atom, a hydroxy group, an amino group, an alkyl group, an alkoxy group, an alkylamino group, and a sulfonyl group. The alkyl group has, for example, 1 to 5 carbon atoms. The alkoxy group has, for example, 1 to 5 carbon atoms. The alkylamino group may be a monoalkylamino group, and may be a dialkylamino group. The alkylamino group has, for example, 1 to 5 carbon atoms. Some of the hydrogen atoms in the alkyl group may be each replaced with, for example, a halogen atom. The quinone compound may be a hydroquinone compound having a structure other than those represented by the formulas (3) and (4).

Specifically, the quinone compound includes, for example, 1,4-benzoquinone, 1,2-benzoquinone, 1,4-naphthoquinone, 1,2-naphthoquinone, 2-methyl-1,4-naphthoquinone, 9,10-phenanthrene quinone, anthraquinone-2-sulfonic acid, trimethyl hydroquinone, and derivatives thereof.

The heteroaromatic compound includes, for example, pyridine, phenothiazine, and derivatives thereof. Preferred are 10-methylphenothiazine, 3-chloro-10-ethyl phenothiazine, and the like.

The naphthalene compound includes, for example, naphthalene, anthracene, and derivatives thereof.

The organic compound is contained in the non-aqueous electrolyte in an amount of preferably 0.1 mass % or more and 5 mass % or less, more preferably 0.5 mass % or more and 3 mass % or less. When the content of the organic compound in the non-aqueous electrolyte is 0.1 mass % or more, the capacity recovery effect by the organic compound can be sufficiently obtained. When the content of the organic compound in the non-aqueous electrolyte is 5 mass % or less, the self-discharge (dissolution of the metal lithium deposited on the negative electrode) by the organic compound can be sufficiently suppressed. The content of the organic compound in the non-aqueous electrolyte can be determined by, for example, a gas chromatography mass spectrometry (GC/MS).

The negative electrode current collector preferably includes a copper foil or a copper alloy foil, in terms of its high electrical conductivity and excellent stability against the above organic compound.

The positive electrode active material includes, for example, a composite oxide containing lithium and a metal M other than lithium. The metal M includes at least a transition metal. Hereinafter, such a composite oxide is referred to as a lithium-containing transition metal oxide. The lithium contained in the lithium-containing transition metal oxide is released as lithium ions from the positive electrode during charge and deposits as lithium metal on the negative electrode. During discharge, the lithium metal dissolves from the negative electrode, and lithium ions are released, which are then absorbed to the composite oxide in the positive electrode. In short, the lithium ions involved in charge and discharge are mostly derived from the solute in the non-aqueous electrolyte and the positive electrode active material. Therefore, when the lithium-containing transition metal oxide has, for example, a layered structure, a molar ratio mLi/mM of a total amount mLi of the lithium present in the positive and negative electrodes to an amount mM of the metal M present in the positive electrode is preferably 1.1 or less.

A detailed description will be given below of each component element of the lithium secondary battery.

[Negative Electrode]

The negative electrode includes a negative electrode current collector. In the lithium secondary battery, lithium metal deposits during charge, for example, on the surface of the negative electrode current collector. Specifically, during charge, lithium ions in the non-aqueous electrolyte receive electrons on the negative electrode current collector and become lithium metal, which deposits on the surface of negative electrode current collector. The lithium metal deposited on the surface of negative electrode current collector dissolves as lithium ions into the non-aqueous electrolyte during discharge. The lithium ions in the non-aqueous electrolyte may be either derived from a lithium salt added to the non-aqueous electrolyte or supplied from the positive electrode active material during charge, or both.

The negative electrode current collector is in the form of an electrically conductive sheet. The conductive sheet may be a foil, film, and the like.

The conductive sheet may have a smooth surface. In this case, the lithium metal derived from the positive electrode tends to uniformly deposit on the conductive sheet during charge. The smooth surface means that the conductive sheet has a maximum height roughness Rz of 20 μm or less. The conductive sheet may have a maximum height roughness Rz of 10 μm or less. The maximum height roughness Rz is measured in accordance with JIS B 0601: 2013.

The negative electrode current collector (conductive sheet) is made of an electrically conductive material other than lithium metal and lithium alloys. The conductive material may be a metal material, such as metal and an alloy. The conductive material preferably causes no reaction with lithium. Specifically, a material that forms neither an alloy nor an intermetallic compound with lithium is preferred. Such a conductive material is exemplified by copper (Cu), nickel (Ni), iron (Fe), and an alloy of one or more of these metal elements, or graphite having a basal plane predominately exposed on its surface. Examples of the alloy include a copper alloy and stainless steel (SUS). Preferred are copper and/or a copper alloy because of its high electrical conductivity.

The negative electrode current collector may have any thickness; the thickness is, for example, 5 μm or more and 300 μm or less.

The negative electrode current collector may have a negative electrode mixture layer (not shown) on its surface. The negative electrode mixture layer is formed by, for example, applying a paste including a negative electrode active material, such as graphite, to at least part of a surface of the negative electrode current collector. In view of achieving a lithium secondary battery superior in capacity to the lithium ion battery, however, the negative electrode mixture layer is formed sufficiently thin so that lithium metal can deposit on the negative electrode.

[Positive Electrode]

The positive electrode includes, for example, a positive electrode current collector and a positive electrode mixture layer supported on the positive electrode current collector. The positive electrode mixture layer includes, for example, a positive electrode active material, an electrically conductive material, and a binder. The positive electrode mixture layer may be formed on one surface or both surfaces of the positive electrode current collector. The positive electrode can be obtained by, for example, applying a positive electrode mixture slurry including a positive electrode active material, an electrically conductive material, and a binder onto both surfaces of the positive electrode current collector, followed by drying and then rolling the dry applied film.

The positive electrode active material absorbs and releases lithium ions. Examples of the positive electrode active material include a lithium-containing transition metal oxide, a transition metal fluoride, a polyanion, a fluorinated polyanion, and a transition metal sulfide. Preferred among them is a lithium-containing transition metal oxide in terms of its low production cost and high average discharge voltage.

Examples of the lithium-containing transition metal oxide include $Li_aCoO_2$, $Li_aNiO_2$, $Li_aMnO_2$, $Li_aCobNi_{1-b}O_2$, $Li_aCo_bM_{1-b}O_c$, $Li_aNi_{1-b}M_bO_c$, $Li_aMn_2O_4$, $Li_aMn_{2-b}M_bO_4$, $LiMePO_4$, and $Li_2MePO_4F$. Here, M is at least one selected from the group consisting of Na, Mg, Ca, Zn, Ga, Ge, Sn, Sc, Ti, V, Cr, Y, Zr, W, Mn, Fe, Co, Ni, Cu, Zn, Al, Cr, Pb, Sb, Bi, and B. Me includes at least one transition element (e.g., at least one selected from the group consisting of Mn, Fe, Co, and Ni). Here, $0 \leq a \leq 1.2$, $0 \leq b \leq 0.9$, and $2.0 \leq c \leq 2.3$ are satisfied. Note that "a" representing the molar ratio of lithium is a value in a discharged state, and corresponds to a value measured immediately after the preparation of the active material, the value being subjected to increase and decrease during charge and discharge.

The lithium-containing transition metal oxide preferably contains Co, Ni and/or Mn as a transition metal element(s) and Al as an optional component and has a layered structure, in view of achieving a high capacity. In this case, in the lithium secondary battery, a molar ratio mLi/mM of a total amount mLi of the lithium present in the positive and negative electrodes to an amount mM of the metal M other than lithium present in the positive electrode is set, for example, 1.1 or less.

The conductive material is, for example, a carbon material. Examples of the carbon material include carbon black, acetylene black, Ketjen Black, carbon nanotube, and graphite.

The binder may be, for example, a fluorocarbon resin, a polyacrylonitrile, a polyimide resin, an acrylic resin, a polyolefin resin, and a rubbery polymer. Examples of the fluorocarbon resin include polytetrafluoroethylene and polyvinylidene fluoride.

The positive electrode current collector is an electrically conductive sheet. The conductive sheet may be a foil, film, and the like. The positive electrode current collector may be coated with a carbon material.

The positive electrode current collector (conductive sheet) may be made of, for example, a metal material, such as Al, Ti, and Fe. The metal material may be Al, an Al alloy, Ti, a Ti alloy, a Fe alloy, and the like. The Fe alloy may be stainless steel (SUS).

The positive electrode current collector may have any thickness: the thickness is, for example, 5 μm or more and 300 μm or less.

[Separator]

A separator may be disposed between the positive electrode and the negative electrode. The separator is a porous sheet having ion permeability and electrically insulating properties. The porous sheet may be, for example, a microporous thin film, a woven fabric, and a nonwoven fabric. The separator is made of any material; the material may be a polymer material. Examples of the polymer material include an olefinic resin, a polyamide resin, and a cellulose. Examples of the olefinic resin include polyethylene, polypropylene, and an ethylene-propylene copolymer. The separator may include an additive, if necessary. The additive is, for example, an inorganic filler.

[Non-Aqueous Electrolyte]

The non-aqueous electrolyte having lithium ion conductivity includes, for example, a non-aqueous solvent, and lithium ion and an anion dissolved in the non-aqueous solvent. The non-aqueous electrolyte may be liquid, and may be gel.

The liquid non-aqueous electrolyte can be prepared by dissolving a lithium salt in the non-aqueous solvent. When the lithium salt is dissolved in the non-aqueous solvent, lithium ion and an anion are produced.

The gel non-aqueous electrolyte includes a lithium salt and a matrix polymer, or includes a lithium salt, a non-aqueous solvent, and a matrix polymer. The matrix polymer is, for example, a polymer material that is gelled by absorbing the non-aqueous solvent. Examples of the polymer material include a fluorocarbon resin, an acrylic resin, and a polyether resin.

The lithium salt or anion may be any known in the art that is utilized for non-aqueous electrolyte for lithium secondary batteries. Specific examples thereof include: $BF_4^-$, $ClO_4^-$, $PF_6^-$, $CF_3SO_3^-$, $CF_3CO_2^-$, imide anions, and an anion of an oxalate complex. Examples of the imide anions include $N(SO_2CF_3)_2^-$, $N(C_mF_{2m+1}SO_2)_x(C_nF_{2n+1}SO_2)_y^-$, where m and n are independently 0 or an integer of 1 or more, x and y are independently 0, 1 or 2, and x+y=2. The oxalate complex anion may contain boron and/or phosphorus. Examples of the oxalate complex anion include a bis(oxalato)borate anion, $BF_2(C_2O_4)^-$, $PF_4(C_2O_4)^-$, and $PF_2(C_2O_4)_2^-$. The non-aqueous electrolyte may include one of these anions, or two or more kinds thereof.

In view of suppressing the dendritic deposition of lithium metal, the non-aqueous electrolyte preferably includes at least an anion of an oxalate complex. The oxalate complex anion interacts with lithium to make lithium metal more likely to deposit uniformly in a fine particulate state. Therefore, a local deposition of lithium metal is unlikely to occur. The oxalate complex anion may be used in combination with one or more other anions, for example, $PF_6^-$ and/or imide anions.

Examples of the non-aqueous solvent include esters, ethers, nitriles, amides, and halogen substituted derivatives of these. The non-aqueous electrolyte may contain one of these non-aqueous solvents, or two or more kinds thereof. Examples of the halogen substituted derivatives include fluorides.

The ester may be, for example, a carbonic ester, a carboxylic acid ester, and the like. Examples of a cyclic carbonic ester include ethylene carbonate, propylene carbonate, and fluoroethylene carbonate (FEC). Examples of a chain carbonic ester include dimethyl carbonate (DMC), ethyl methyl carbonate (EMC), and diethyl carbonate. Examples of a cyclic carboxylic acid ester include γ-butyrolactone and γ-valerolactone. Examples of a chain carboxylic acid ester include ethyl acetate, methyl propionate, and methyl fluoropropionate.

The ether may be a cyclic or chain ether. Examples of the cyclic ether include 1,3-dioxolane, 4-methyl-1,3-dioxolane, tetrahydrofuran, and 2-methyltetrahydrofuran. Examples of the chain ether include 1,2-dimethoxyethane, diethyl ether, ethyl vinyl ether, methyl phenyl ether, benzyl ethyl ether, diphenyl ether, dibenzyl ether, 1,2-diethoxyethane, and diethylene glycol dimethyl ether.

The lithium salt concentration in the non-aqueous electrolyte is, for example, 0.5 mol/L or more and 3.5 mol/L or less. The anion concentration in the non-aqueous electrolyte may be set to 0.5 mol/L or more and 3.5 mol/L or less. The oxalate complex anion concentration in the non-aqueous electrolyte may be set to 0.05 mol/L or more and 1 mol/L or less.

The non-aqueous electrolyte may include an additive. The additive may form a surface film on the negative electrode. When the surface film derived from the additive is formed on the negative electrode, the dendrite formation and growth tend to be suppressed. Examples of the additive include vinylene carbonate, FEC, and vinyl ethyl carbonate (VEC).

[Lithium Secondary Battery]

Figure 2:
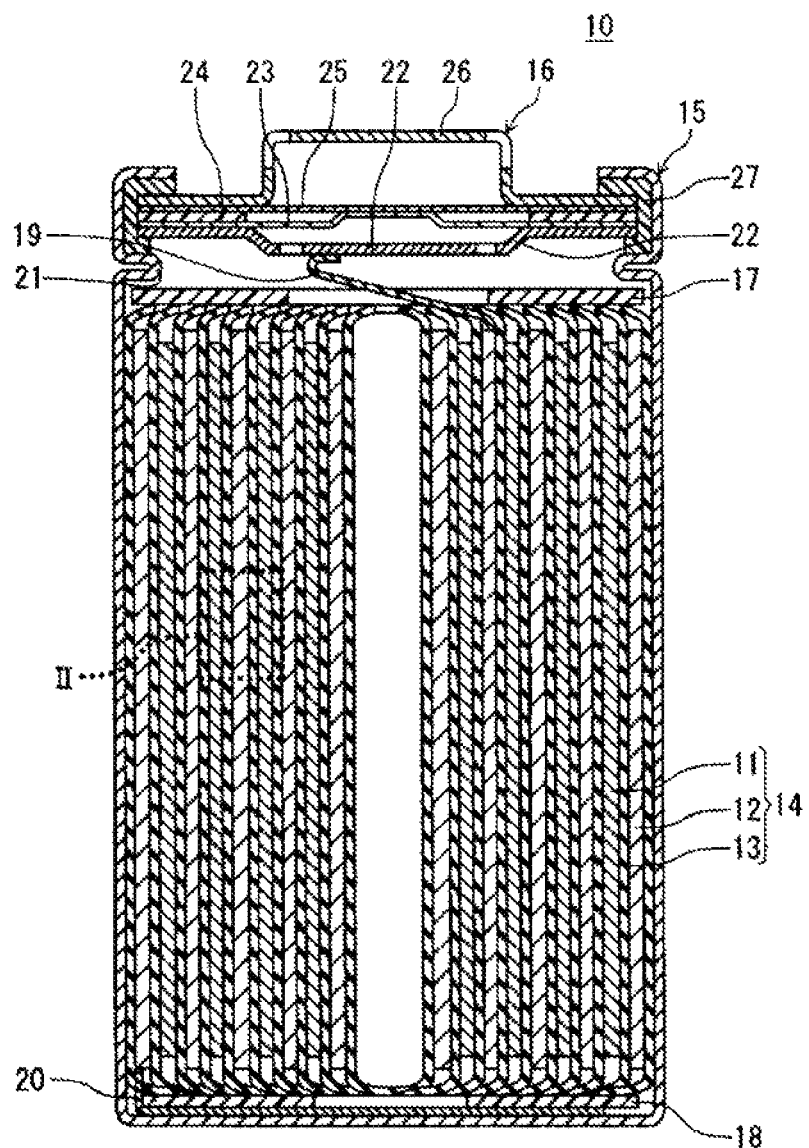
FIG. 2 A longitudinal cross-sectional view of a lithium secondary battery according to an embodiment of the present disclosure.
Figure 3:
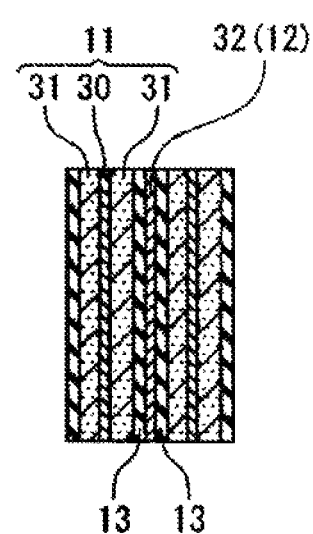
FIG. 3 A cross-sectional view of an essential part of the lithium secondary battery of FIG. 2.

A description will be given below of a configuration of a lithium secondary battery according to the present disclosure with reference to the drawings, with a cylindrical battery having a wound electrode group taken as an example. FIG. 2 is a longitudinal cross-sectional view of a lithium secondary battery 10, which is an example of the present embodiment. FIG. 3 is a cross-sectional view of an essential part (part of an electrode group 14) of the lithium secondary battery 10 of FIG. 2. It is to be noted, however, the present disclosure is not limited to the following configuration.

The lithium secondary battery 10 is a cylindrical battery including a cylindrical battery case, a wound electrode group 14 housed in the battery case, and a non-aqueous electrolyte (not shown). The battery case comprises a case main body 15 which is a bottomed cylindrical metal container, and a sealing body 16 sealing an opening of the case main body 15. The case main body 15 has an annular step portion 21 formed by partially pressing from outside the sidewall of the case main body in the vicinity of the opening. The sealing body 16 is supported on the surface of the step portion 21 on the opening side. Between the case main body 15 and the sealing body 16, a gasket 27 is placed, by which the hermeticity of the battery case is secured. Within the case main body 15, electrically insulating plates 17 and 18 are placed respectively at both ends of the electrode group 14 in the winding axis direction.

The sealing body 16 includes a filter 22, a lower valve body 23, an electrically insulating member 24, an upper valve body 25, and a cap 26. The cap 26 is disposed outside the case main body 15, and the filter 22 is disposed inside the case main body 15. The lower valve body 23 and the upper valve body 25 are connected to each other at the center portion of each, and are interposed by the insulating member 24 at the peripheral portion of each. The filter 22 and the lower valve body 23 are connected to each other at the peripheral portion of each. The upper valve body 25 and the cap 26 are connected to each other at the peripheral portion of each. The lower valve body 23 is provided with an air vent hole. When the internal pressure of the battery case rises due to abnormal heat generation or other events, the upper valve body 25 bulges toward the cap 26 and spaced away from the lower valve body 23, which breaks the electrical connection between the lower valve body 23 and the upper valve body 25. Furthermore, when the internal-pressure further rises, the upper valve body 25 raptures, to let gas out though an aperture provided in the cap 26.

The electrode group 14 includes a positive electrode 11, a negative electrode (negative electrode current collector) 12, and a separator 13. The positive electrode 11, the negative electrode 12, and the separator 13 interposed therebetween are all belt-like shaped, and are wound spirally together such that the width direction of each of them is in parallel with the winding axis direction. At the both ends of the electrode group 14 in the winding axis direction, the insulating plates 17 and 18 are placed, respectively.

FIG. 3 is an enlarged view of a region II in FIG. 2. As illustrated in FIG. 3, the positive electrode 11 includes a positive electrode current collector 30 and a positive electrode mixture layer 31. The positive electrode 11 is electrically connected via a positive electrode lead 19 to the cap 26 serving as a positive electrode terminal. One end of the positive electrode lead 19 is connected to the positive electrode 11, for example, at somewhere around its center in the longitudinal direction. The other end of the positive electrode lead 19 extended from the positive electrode 11 is passed through a through-hole provide in the insulating plate 17 and welded to the inner side surface of the filter 22.

The negative electrode 12 includes a negative electrode current collector 32 (see FIG. 3). The negative electrode 12 is electrically connected via a negative electrode lead 20 to the case main body 15 serving as a negative electrode terminal. One end of the negative electrode lead 20 is connected to the negative electrode 12, for example, at its end in the longitudinal direction, and the other end thereof is welded to the inner bottom surface of the case main body 15.

Although the illustrated example is a cylindrical lithium secondary battery including a wound electrode group, the shape and the like of the cylindrical lithium secondary battery is not limited thereto, and may be selected according to its use and the like from various shapes, such as cylindrical, coin, square, sheet, and flat shapes. The electrode group also may be in any form, and may be in the form of a stack. The component elements other than the electrode group and the non-aqueous electrolyte of the lithium secondary battery may have any known configuration.

EXAMPLES

The lithium secondary battery according to the present disclosure will be described more specifically with reference to Examples and Comparative Examples. It is to be noted, however, the present disclosure is not limited to the following Examples.

Example 1

(1) Production of Positive Electrode

A lithium-containing transition metal oxide having a layered structure and containing Li, Ni, Co, and Al such that the mole ratio of Li to the total of Ni, Co, and Al was 1.0 (NCA; positive electrode active material), acetylene black (AB; conductive material), and polyvinylidene fluoride (PVdF; binder) were mixed in a mass ratio of NCA:AB: PVdF=100:0.75:0.6, to which N-methyl-2-pyrrolidone (NMP) was added in an appropriate amount and stirred, to prepare a positive electrode mixture slurry.

The prepared positive electrode mixture slurry was applied to both surfaces of an Al foil (positive electrode current collector), and then dried and passed between rolls so that the applied film of the positive electrode mixture is rolled to a certain thickness. Lastly, the resultant stack of the positive electrode current collector and the positive electrode mixture was cut in a predetermined electrode size, to give a positive electrode in which a positive electrode mixture layer is formed on both surfaces of the positive electrode current collector.

Here, part of the positive electrode was left without forming the positive electrode mixture layer thereon, to expose the positive electrode current collector therefrom. To the positive electrode current collector-exposed part, one end of a positive electrode lead made of Al was attached by welding.

(2) Production of Negative Electrode

An electrolytic copper foil (thickness 10 μm) was cut in a predetermined electrode size, to give a negative electrode (negative electrode current collector). To the negative electrode current collector, one end of a negative electrode lead made of nickel was attached by welding.

(3) Preparation of Non-Aqueous Electrolyte

Fluoroethylene carbonate (FEC), ethyl methyl carbonate (EMC), and dimethyl carbonate (DMC) were mixed in a volume ratio of FEC:EMC:DMC=20:5:75. To the resultant mixed solvent, $LiPF_6$ and $LiBF_2(C_2O_4)$ were dissolved at a concentration of 1 mol/L and 0.5 mol/L, respectively, to prepare a liquid non-aqueous electrolyte. Additionally, tetrathiafulvalene (TTF) was contained in the non-aqueous electrolyte. The TTF content in the non-aqueous electrolyte was 1 mass %.

(4) Fabrication of Battery

The positive electrode and the negative electrode current collector were spirally wound in an inert atmosphere with a separator (microporous film) made of polyethylene interposed therebetween, to form an electrode group. Here, the lithium contained in the electrode group was all derived from the positive electrode. Therefore, a molar ratio mLi/mM of a total amount mLi of the lithium present in the positive and negative electrodes to an amount mM of the metal M (here, Ni, Co, and Al) present in the positive electrode was 1.0.

The electrode group was housed in a pouch-like outer case formed of a laminate sheet having an Al layer, into which the non-aqueous electrolyte was injected. Thereafter, the outer case was sealed. A lithium secondary battery A1 was thus fabricated. When housing the electrode group in the outer case, the other end of the positive electrode lead and the other end of the negative electrode lead were extended outside the outer case.

[Evaluation]

The battery A1 was subjected to a charge-discharge test for evaluation.

In the charge-discharge test, in a 25° C. constant-temperature bath, the battery was charged under the conditions below, and after left to stand for 20 min, discharged under the conditions below. This cycle was repeated 50 cycles in total.

(Charge)

A constant-current charge was performed until the battery voltage reached 4.3 V at a current of 10 mA per unit area (square centimeters) of the electrode, and then a constant-voltage charge was performed at a voltage of 4.3 V until the current value per unit area of the electrode reached 1 mA.

(Discharge)

A constant-current discharge was performed until the battery voltage reached 2.5 V at a current of 10 mA per unit area of the electrode.

A ratio ($C_2/C_1 \times 100$) of a discharge capacity $C_2$ at the 50th cycle to a discharge capacity $C_1$ at the 1st cycle was calculated as a capacity retention ratio $R_1$ (%) upon 50 cycles.

Furthermore, after the discharge at the 50th cycle, the battery was left to stand for 240 h. After the rest for 240 h, the charge and discharge were performed under the same conditions as above, to determine a discharge capacity $C_3$.

A ratio ($C_3/C_1 \times 100$) of the discharge capacity $C_3$ to the discharge capacity $C_1$ was calculated as a capacity retention ratio $R_2$ (%) after the rest for 240 h. A difference ($R_2-R_1$) between the capacity retention ratio $R_2$ after the rest for 240 h and the capacity retention ratio $R_1$ upon 50 cycles was calculated as a recovery ratio (%).

Example 2

A lithium secondary battery A2 was fabricated and evaluated in the same manner as in Example 1, except that $LiBF_2(C_2O_4)$ was not dissolved in the mixed solvent.

Comparative Example 1

A lithium secondary battery B1 was fabricated and evaluated in the same manner as in Example 1, except that TTF was not contained in the non-aqueous electrolyte in the preparation of non-aqueous electrolyte.

Comparative Example 2

A lithium secondary battery B2 was fabricated and evaluated in the same manner as in Example 1, except that $LiBF_2(C_2O_4)$ was not dissolved in the mixed solvent, and TTF was not contained in the non-aqueous electrolyte in the preparation of non-aqueous electrolyte.

The evaluation results of the batteries A1 and A2 and the batteries B1 and B2 are shown in Table 1. Note that LiFOB in Table 1 represents $LiBF_2(C_2O_4)$.

TABLE 1

|  | | Non-aqueous electrolyte | | Evaluation | | |
| --- | --- | --- | --- | --- | --- | --- |
|  | Battery No. | TTF content (mol %) | LiFOB concentration (mol/L) | Capacity retention ratio $R_1$ upon 50 cycles | Capacity retention ratio $R_2$ after 240-h rest | Recovery ratio ($R_2 - R_1$) (%) |
| Ex. 1 | A1 | 1 | 0.5 | 74.2 | 87.9 | 13.7 |
| Ex. 2 | A2 | 1 | 0 | 59.2 | 70.4 | 11.2 |

TABLE 1-continued

| | | Non-aqueous electrolyte | | Evaluation | | |
|---|---|---|---|---|---|---|
| | Battery No. | TTF content (mol %) | LiFOB concentration (mol/L) | Capacity retention ratio $R_1$ upon 50 cycles | Capacity retention ratio $R_2$ after 240-h rest | Recovery ratio ($R_2 - R_1$) (%) |
| Com. Ex. 1 | B1 | 0 | 0.5 | 70.7 | 71.6 | 0.9 |
| Com. Ex. 2 | B2 | 0 | 0 | 51.6 | 53 | 1.4 |

The batteries A1 and A2 including the non-aqueous electrolyte containing TTF exhibited a high recovery ratio. In the batteries A1 and A2, the TTF contained in the non-aqueous electrolyte served to make the Li isolated from the negative electrode available for the charge-discharge reaction, and this resulted in considerable recovery of the capacity retention ratio after the rest for 240 h.

In the battery A1, in which $LiBF_2(C_2O_4)$ was contained in the non-aqueous electrolyte, the deposition morphology of Li was improved, resulted in a high capacity retention ratio $R_1$. The combination of TTF with $LiBF_2(C_2O_4)$ resulted in an enhanced capacity retention ratio $R_2$.

In the battery B1, in which no TTF was contained in the non-aqueous electrolyte, the recovery ratio was low.

In the battery B2, in which neither TTF nor $LiBF_2(C_2O_4)$ was contained in the non-aqueous electrolyte, the capacity retention ratios $R_1$ and $R_2$ both dropped, and the recovery ratio was also low.

INDUSTRIAL APPLICABILITY

The lithium secondary battery of the present disclosure is suitably applicable for electronic devices, such as cellular phones, smart phones, and tablet terminals, electric vehicles including hybrids and plug-in hybrids, and home storage battery systems combined with a solar cell.

REFERENCE SIGNS LIST 10 lithium secondary battery
11 positive electrode
12 negative electrode
13 separator
14 electrode group
15 cases main body
16 sealing body
17, 18 insulating plate
19 positive electrode lead
20 negative electrode lead
21 step portion
22 filter
23 lower valve body
24 insulating member
25 upper valve body
26 cap
27 gasket
30 positive electrode current collector
31 positive electrode mixtures layer
32 negative electrode current collector

The invention claimed is:

1. A lithium metal secondary battery, comprising:
a positive electrode comprising a positive electrode active material; a negative electrode having a negative electrode current collector that faces the positive electrode; and a non-aqueous electrolyte, wherein
lithium metal deposits on the negative electrode during charge, and the lithium metal dissolves from the negative electrode into the non-aqueous electrolyte during discharge,
the non-aqueous electrolyte including an organic compound having a redox potential of 0 V or more and 4 V or less vs $Li/Li^+$, the organic compound includes a tetrathiafulvalene compound,
the positive electrode active material includes a composite oxide containing lithium and a transition metal;
a molar ratio $m_{Li}/m_M$ of a total amount $m_{Li}$ of the lithium present in the positive and negative electrodes to an amount $m_M$ of the metal M other than lithium present in the positive electrode is 1.1 or less.

2. The lithium metal secondary battery according to claim 1, wherein the organic compound further includes at least one selected from the group consisting of, a metallocene compound, a quinone compound, a heteroaromatic compound, and a naphthalene compound.

3. The lithium metal secondary battery according to claim 1, wherein the non-aqueous electrolyte contains lithium ion and an anion, and the anion comprises at least an anion of an oxalate complex.

4. The lithium metal secondary battery according to claim 3, wherein the anion of the oxalate complex is a bis(oxalato)borate anion.

5. The lithium metal secondary battery according to claim 3, wherein the anion comprises the anion of an oxalate complex and at least one other anion.

6. The lithium metal secondary battery according to claim 5, wherein the at least one other anion is selected from the group consisting of $PF_6^-$ and imide anions.

7. The lithium metal secondary battery according to claim 1, wherein the organic compound is contained in the non-aqueous electrolyte in an amount of 0.1 mass % or more and 5 mass % or less.

8. The lithium metal secondary battery according to claim 1, wherein the negative electrode current collector includes a copper foil or a copper alloy foil.

9. The lithium metal secondary battery according to claim 1, wherein the organic compound having a redox potential of 2 V or more and 4 V or less vs $Li/Li^+$.

10. The lithium metal secondary battery according to claim 1, wherein the organic compound having a redox potential of 2.5 V or more and 3.7 V or less vs $Li/Li^+$.

* * * * *